May 31, 1966 H. R. GRUBB 3,253,605

FLUID LOGIC TRIGGER

Filed Dec. 18, 1963

INVENTOR
HAROLD R. GRUBB
BY Francis V. Giolma
ATTORNEY

United States Patent Office 3,253,605
Patented May 31, 1966

3,253,605

FLUID LOGIC TRIGGER

Harold R. Grubb, Owego, N.Y., assignor to International Business Machines Corporation, New York, N.Y., a corporation of New York Filed Dec. 18, 1963, Ser. No. 331,464
5 Claims. (Cl. 137—81.5)

This invention relates generally to logic devices and it has reference in particular to fluid logic triggers.

Generally stated, it is an object of the invention to provide an improved logic device.

More specifically, it is an object of the present invention to provide a fluid logic trigger.

One object of the invention is to provide for combining a plurality of fluid devices to simulate a logic trigger.

Another object of the invention is to provide for combining a monostable fluid switch with a bistable fluid switch for producing a fluid logic trigger device.

Yet another object of the invention is to provide for using the switching delay time of a monostable fluid switch in a logic input to a bistable fluid switch for simulating a trigger circuit with an A.C. Set and a D.C. level ON gate input signal.

It is also an object of this invention to provide for using a monostable switch device to effect operation of a bistable switch device so as to provide a predetermined set time for the bistable device.

In practicing the invention in accordance with a preferred embodiment, a bistable fluid pressure switch is switched off and on through OR circuits either directly by signals corresponding to D.C. set and reset signals, respectively, or by means of AND circuits which respectively combine ON and OFF level gate signals with control signals to and the outputs from monostable fluid pressure switches to simulate A.C. set and reset signals.

The foregoing and other objects, features and advantages of the invention will be apparent from the following more particular description of preferred embodiments of the invention as illustrated in the accompanying drawings.

Figure 1:
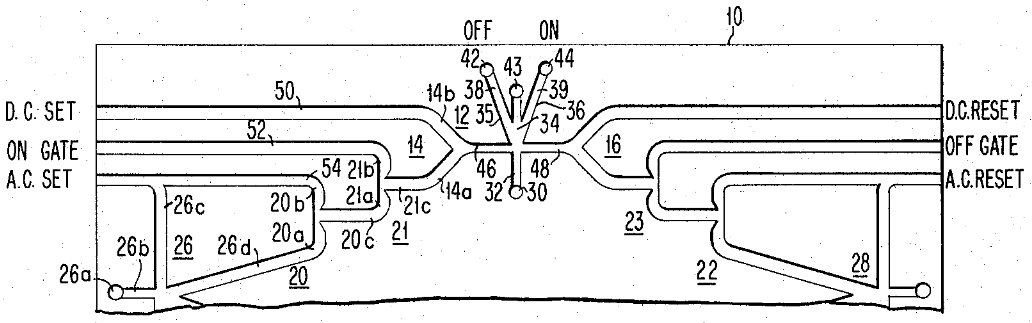
FIG. 1 is a schematic drawing of a fluid pressure logic trigger embodying the invention in one of its forms.

Referring particularly to FIG. 1, the reference numeral 10 designates a body or plate of a plastic material or the like from which the fluid logic trigger of the invention is formed by machining or by an etching process to provide the passages shown, in a manner well-known in the art. As shown, the reference numeral 12 denotes generaly a bistable latch type fluid pressure switch which may be turned on or off through fluid pressure OR devices 14 and 16 in response to outputs from associated AND devices 20–21 and 22–23, respectively. Monostable fluid pressure switch devices 26 and 28 are utilized in conjunction with suitable sources of fluid pressure to provide the desired timed signals to the AND devices 20 and 22, respectively, for simulating A.C. Set and Reset.

The bistable fluid amplifier switch 12 may be of a type well known in the art, comprising for example a supply port 30 for connection to a source of fluid pressure and which connects to an inlet passage 32 opening into a receiving chamber 34 defined by divergent side walls 35 and 36 which are associated with OFF and ON output passages 38 and 39 connecting to OFF and ON outlet ports 42 and 44, respectively. Control ports or passages 46 and 48 are disposed on opposite sides of the inlet passage 32 for controlling the direction of the fluid stream from the inlet port 30 to either the OFF outlet port 42 or the ON outlet port 44. An escape port 43 is disposed between the outlet ports 42 and 44.

Pressure fluid is selectively supplied to the control passages 46 and 48 from the OR devices 14 and 16, respectively, each of which are substantially identical so that only the OR 14 will be described. It may, for example, comprise converging passages or channels **14*a* and 14*b* so arranged that pressure fluid applied to either of these channels will enter the control passage 46 for controlling the direction of the main fluid stream. Passage 14*b* may be connected to a source of fluid pressure by means of a channel 50 for providing a D.C. Set signal for controlling operation of the bistable fluid switch 12. The other passage 14*a* of the OR device 14 is connected to the output passage 21*c* of AND device 21 which comprises a substantially T-shaped arrangement of passage having a pair of inlet passages 21*a* and 21*b* disposed in opposed relation and both connected to an outlet passage 21*c* which is substantially perpendicular to the inlet passages. Accordingly, pressure fluid applied to either of the inlet passages 21*b* or 21*a* will not provide an output at passage 21*c*, but this requires input to both passages 21*b* and 21*a*. The passage 21*b* may be connected to an ON gate fluid pressure source by means of a passage 52. The other input passage 21*a* is connected to the output passage 20*c* of the AND device 20. Input passages 20*a* and 20*b* of the AND device 20 are arranged in a similar T-shaped configuration as described in connection with the AND device 21. The passage 20*b* connects by means of a passage 54 to a source of fluid pressure signal for simulating an A.C. Set signal. The other inlet passage 20*a* of the AND device 20 is connected to an outlet passage 26*d* of the monostable switch device 26, which is generally similar to switch device 12 but instead of having a pair of divergent wall sections, is disposed to have only a single divergent wall section relative to an inlet passage 26*b* of the device which is connected to an inlet port 26*a* disposed to be connected to a source of fluid pressure. A control passage 26*c* of the monostable switch 26, which intersects the inlet passage adjacent the start of the outlet passage 26*d*, is also connected to the passage 54 so as to be subjected to the A.C. Set signal applied thereto, and provides for switching the fluid stream away from outlet passage in response to a fluid pressure signal applied to control passage 26*c***.

With the inlet port **26*a* of the monostable switch 26 connected to a source of fluid pressure as well as the inlet port 30 of the bistable switch 12, a fluid pressure output will be applied to the outlet passage 26*d*, but because the input passage 20*b* of the AND device 20 is not normally energized, no signal is applied to the bistable switch device 12, which will remain latched in its previous condition, which for purposes of discussion may be assumed to be in the OFF state with the fluid stream from the source inlet 30 being directed along the OFF outlet passage 35 to the outlet port 42**.

The switch device 12 may be turned on by applying an ON gate signal to the passage 52 together with an A.C. Set signal to the passage 54. The ON gate signal to passage 52 cannot alone produce an output, since fluid pressure must be applied to both inlet passages **21*a* and 21*b* of the AND device 21 to provide an output. Since the monostable switch 26 was assumed to be in the ON state, the pressure fluid from the inlet port 26*a* will be directed along the outlet passage 62*d* to the inlet passage 20*a* of the AND device 20. Accordingly, an output will be provided through outlet passage 20*c* to the inlet passage 21*a* of AND device 21. This signal combined with the ON gate signal over passage 52 provides an output through outlet passage 21***c* of the AND device 21 to the inlet passage 14*a* of an OR device 14. This signal is applied through the control passage 46 to effect switching of a fluid pressure stream from the inlet port 30, switching it from the outlet passage 35 to the output passage 34 and providing a fluid pressure signal at the ON outlet port 44, thus turning the switch ON.

Figure 2:
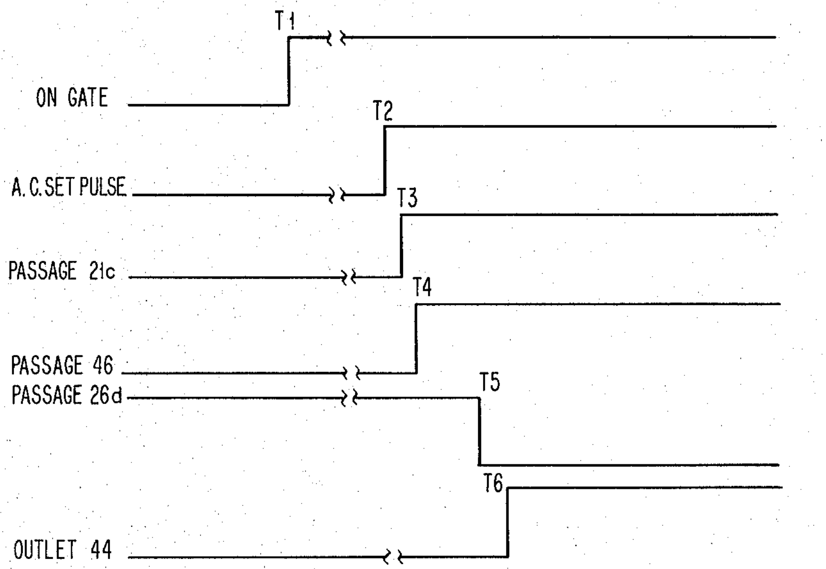
FIG. 2 shows a plurality of signal timing curves illustrating the operation of the device of FIG. 1.

Referring to FIG. 2 it will be seen that the ON gate signal applied to the passage 52 is shown as being applied at a time T1. This time must occur at the same time or before the application of the A.C. Set pulse to passage 54, since the ON gate signal must be present at the time of the existence of the A.C. Set signal which is of short duration as controlled by the monostable device 26. This control is affected since the monostable switch device 26 commences to turn the output signal over outlet passage 26*d* OFF as soon as the A.C. Set pulse is applied to the control port 26*c* as shown at T2. This means that the fluid pressure is applied to the inlet passages 20*a* and 20*b* only during the switching time of the monostable device 26 which may be on the order of a millisecond. Outputs will thus be obtained from the AND devices 20 and 21 at passage 21*c* as soon as the A.C. Set signal is applied to the channel 52, accounting for the necessary delay time of the passages so that the signal will be available at passage 21*c* (as shown at T3), which is the outlet of the AND devices 20 and 21 for input to the OR device 14, shortly after the A.C. Set pulse is applied. The output from the OR device 14 likewise occurs shortly after the input thereto as illustrated by the curve T4 at passage 46. At the end of the switching time for the switch device 26, the output from the outlet passage 26*d* will be terminated as the fluid stream is diverted from the outlet passage 26*d* by the A.C. Set signal at the control passage 26*c*. Accordingly, the output at passage 26*d* as shown by the curve T5 will drop. The bistable switch device 12 is switched by the output signal represented by the curve T4 at passage 46, and the ON output represented by the curve T6 at outlet 44 rises, even though the output of the monostable switch device 26 is terminated previously. Reset of the switch is effected in a similar manner by applying signals to the OFF gate and A.C. Reset passages of the trigger.

Figure 3:
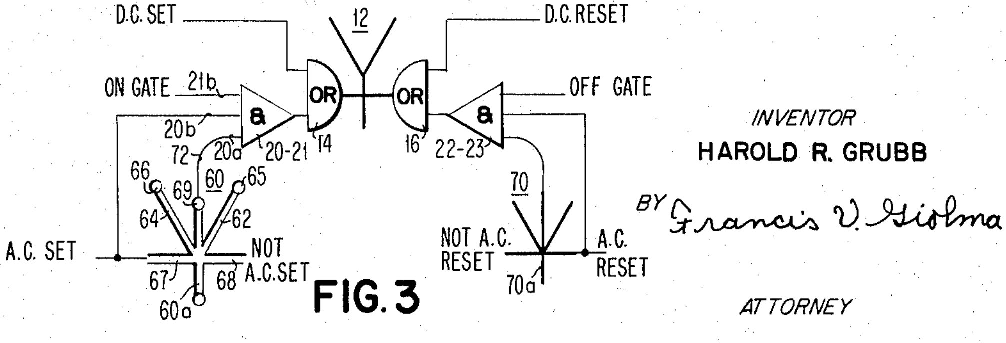
FIG. 3 is a schematic drawing of another embodiment of the invention.

Referring to FIG. 3, the reference numeral 12 again denotes a bistable latch type fluid pressure switch device controlled through fluid OR devices 14 and 16, respectively. The inputs to the devices 14 and 16 are likewise provided at D.C. Set source signals and D.C. Reset source signals, or from AND devices 20–21 and 22–23 as shown in connection with the system of FIG. 1. Instead of using monostable switch devices 26 and 28 as in FIG. 1, bistable latch type fluid pressure switch devices 60 and 70 similar to switch device 12 are utilized having inlet passages 60*a* and 70*a* connected to a source of fluid pressure. Since both the switch devices 60 and 70 may be identical and are similar to switch 12 of FIG. 1, the description will be limited to the switch device 60 which is provided in the usual manner with divergent outlet passages 62 and 64 connecting to ON and OFF outlets 65, 66, respectively. Control passages 67 and 68 are provided in the usual manner for directing the flow of fluid pressure from the inlet passage to one or the other of the outlet passages. In between the outlet passages 65 and 66 is an intermediate escape port 69 which will be subjected to a pulse of fluid pressure as the stream is diverted from the one passage to the other. This port may be connected by means of a conduit 72 to one input 20*a* of the AND device 20–21 while the source of A.C. Set signal is applied to the control passage 67 and to the inlet passage 20*b* of the AND device 20–21, the ON gate signal being applied to the passage 21*b* of the AND device.

Operation of the trigger of FIG. 3 is substantially identical to that of FIG. 1, the output of the AND devices 20–21 being obtained only during the switching time of the bistable switch device 60 as the stream is deflected from the one outlet port 66 to the other port 65, thus providing an outlet pulse from the intermediate port 69 for application to AND devices 20–21 causing AND devices 20–21 to provide an output of timed duration to be applied to the OR device 14, and thence to the control passage of the bistable switch 12 for operating the bistable fluid pressure switch 12 from the OFF to the ON position as described in connection with the trigger of FIG. 1.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Switch means comprising, (a) a first switch device having an input with ON and OFF switch elements operable to provide a controlled output from said input, (b) a second switch device having a normal operating position for providing an output signal from an input source and having control means for terminating said output signal in response to a control signal, (c) means providing a gating signal, (d) other means providing a control signal, (e) means for applying the control signal to said control means to provide a momentary output signal by terminating said output signal, and (f) means including a logic AND device jointly responsive to the gating signal, the control signal and said momentary output signal connected to apply a signal to one of said switch elements to change the condition of said first switch device.

2. In combination, (a) a bistable switch device, having input and output means and control means selectively operable to connect the input and output means to provide an output signal, (b) an additional switch device having input and output means and control means operable to control the connection of the input and output means to provide a momentary output signal, (c) a first logic AND device having a plurality of inputs and an output connected to effect operation of the control means of the bistable switch device, (d) means for applying a gate signal to one of said first AND inputs, (e) other means for applying a set signal to the control means of the additional switch device and through an additional AND device having a plurality of inputs to another of said first AND inputs, and (f) means for connecting the output means of the additional switch means to apply said momentary output signal to yet another of said inputs.

3. A trigger comprising, (a) a bistable fluid switch having input and output ports for the passage of a pressure fluid and control ports for controlling the flow of pressure fluid from the input to the output ports, (b) an additional fluid switch having inlet and outlet ports and a control port for effecting passage of pressure fluid between the inlet and outlet ports for a predetermined switching time, (c) a fluid logic AND device having an output connected to apply a signal to the control port of the bistable switch device and having a plurality of inputs, (d) means for applying a fluid pressure gating signal to one of the AND inputs, (e) other means for applying a fluid pressure control signal to another of said AND inputs and to the control port of said additional fluid switch, and (f) means for applying a signal from the additional fluid switch to the other of the AND inputs during switching of the additional fluid switch.

4. In combination, (a) a bistable fluid switch device having an inlet port and OFF and ON outlet ports with a pair of control ports for controlling the flow of pressure fluid between the inlet and outlet ports, (b) a pair of monostable fluid switch devices each having normally connected inlet and outlet ports to provide for the passage of fluid and a control port for discontinuing the flow of fluid between the inlet and outlet ports in response to a control signal, (c) a fluid logic AND device associated with and having an output connected to each one of the control ports of the bistable switch device and having three inputs, (d) means for applying ON and OFF gating signals to one input of the respective AND devices, (e) means connecting the outputs of the monostable switch devices to the second input of its associated AND device, and (f) means for applying set and reset fluid signals to the control ports of the respective monostable switch devices and the third inputs of their associated AND devices jointly.

5. In combination, (a) a first bistable fluid pressure switch having an inlet port and a pair of outlet ports with a pair of control ports for switching a pressure fluid between the inlet port and the outlet ports, (b) second and third bistable fluid pressure switches, each having an inlet port and a pair of outlet ports with an intermediate port and a pair of control ports for switching a fluid stream between the inlet port and the outlet ports to provide a momentary output from said intermediate port during switching, (c) means including a pair of fluid logic AND devices having outputs connected to the respective control ports of the first bistable device and each having a plurality of inputs, (d) means for applying ON and OFF gate fluid signals respectively to one input of each of said AND devices, (e) additional means for applying set and reset signals respectively to both another input of a respective AND device and the control port of the associated one of the second and third switches, (f) means for connecting the intermediate ports of the second and third fluid switches to the other of said AND inputs, and (g) means for applying reset signals to the other control ports of said second and third fluid switches.

References Cited by the Examiner

UNITED STATES PATENTS

| | | | |
|---|---|---|---|
| 3,107,850 | 10/1963 | Warren et al. | 137—81.5 |
| 3,128,040 | 4/1964 | Norwood. | |
| 3,159,168 | 12/1964 | Reader | 137—81.5 |

M. CARY NELSON, *Primary Examiner.*

S. SCOTT, *Assistant Examiner.*